No. 628,526. Patented July 11, 1899.
E. CLIFF.
SIDE BEARING FOR CAR TRUCKS.
(Application filed May 5, 1899.)
(No Model.) 2 Sheets—Sheet 1.

WITNESSES: Gustave Dieterich. John Kehlenbeck.

INVENTOR Edward Cliff, BY Chas. C. Gill ATTORNEY

THE NORRIS PETERS CO., PHOTO-LITHO., WASHINGTON, D. C.

No. 628,526. Patented July 11, 1899.
E. CLIFF.
SIDE BEARING FOR CAR TRUCKS.
(Application filed May 5, 1899.)
(No Model.) 2 Sheets—Sheet 2.
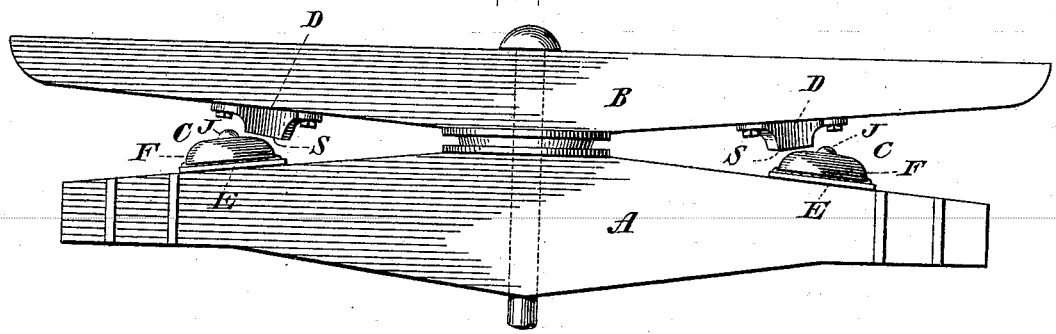
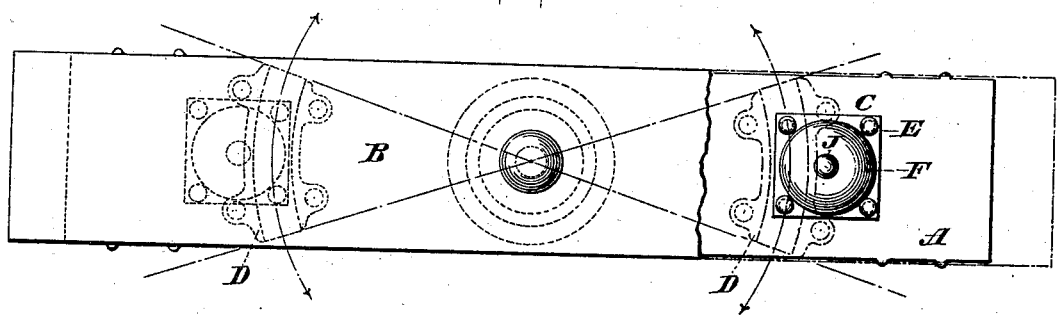
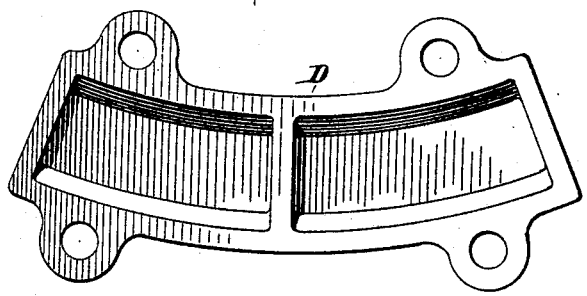
WITNESSES: INVENTOR
Gustave Dieterich Edward Cliff
John Kehlenbeck. BY
Chas. C. Gill
ATTORNEY

UNITED STATES PATENT OFFICE.

EDWARD CLIFF, OF NEWARK, NEW JERSEY.

SIDE BEARING FOR CAR-TRUCKS.

SPECIFICATION forming part of Letters Patent No. 628,526, dated July 11, 1899.

Application filed May 5, 1899. Serial No. 715,637. (No model.)

*To all whom it may concern:*

Be it known that I, EDWARD CLIFF, a citizen of the United States, and a resident of Newark, in the county of Essex and State of New Jersey, have invented certain new and useful Improvements in Side Bearings for Car-Trucks, of which the following is a specification.

The invention relates to improvements in swiveling car-trucks, and pertains more particularly to novel side bearings arranged adjacent to the ends of the truck-bolster and adapted to be engaged by the body-bolster, which should under ordinary conditions be provided with suitable rub-irons or surfaces to contact with the side bearings.

The present invention consists in part in a side bearing which is adapted to have a horizontal rotary motion around or with a vertical axis, and this side bearing thus constructed is utilized, in connection with a rub-iron or other suitable surface of the body-bolster, so that especially during the travel of the cars around curves the rub-iron will contact with the side bearing, at one side of the center thereof, and cause the latter to perform a rotary motion coextensive with its sweep against the rub-iron or other surface of the body-bolster.

The object of my invention is to produce a side bearing which is an improvement over all other side bearings known to me and to obviate the known objections to the side bearings as heretofore made.

My invention obviates the difficulties incident to hauling the cars around curves. Its use results in a reduction of the wear of the flanges of the truck-wheels and also the wear of the rails. It permits the cars after having passed around a curve to readily straighten out, and renders it entirely easy and safe to haul the cars around short curves and over tangent curves.

The invention will be fully understood from the detailed description hereinafter presented, reference being had to the accompanying drawings, in which—

Figure 1:
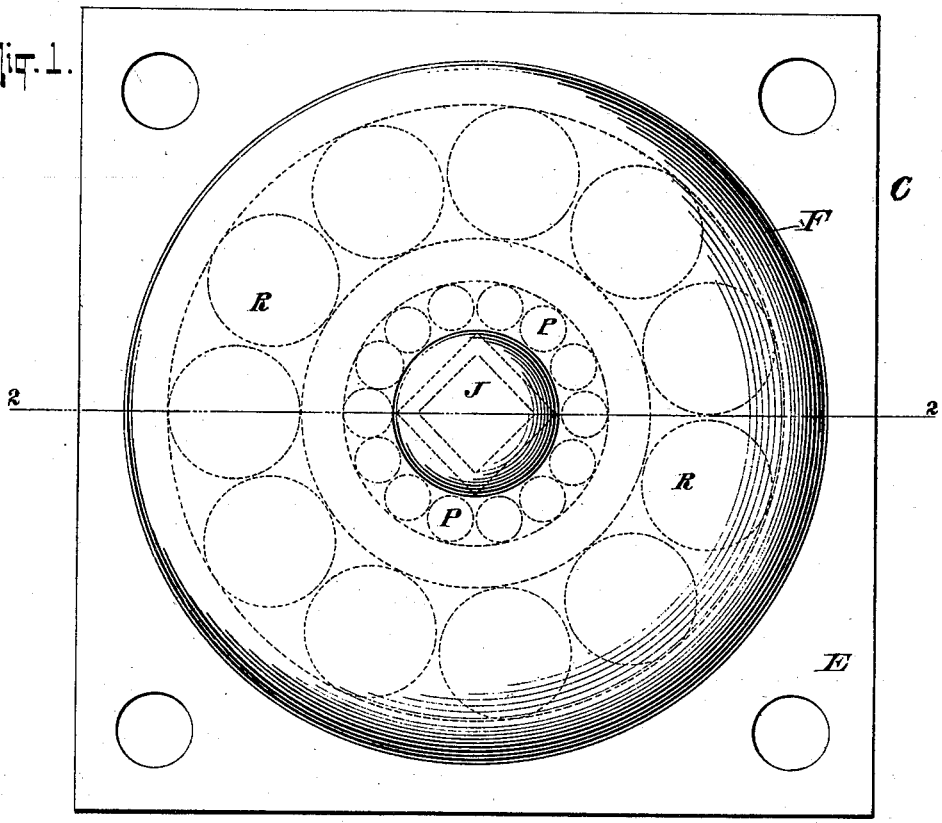
Figure 2:
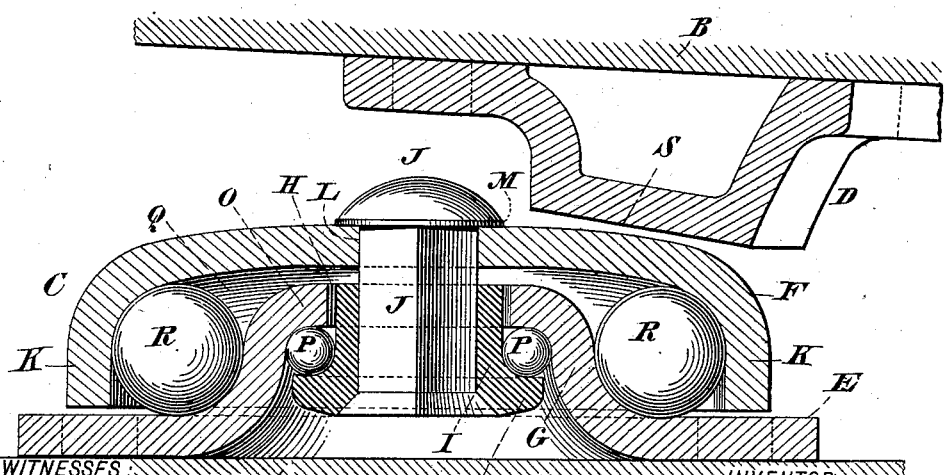

Figure 1 is a top view of a side bearing constructed in accordance with and embodying the invention. Fig. 2 is a central vertical section of same on the dotted line 2 2 of Fig. 1, and illustrates in addition the portion of the body-bolster carrying the rub-iron for contact with the side bearing, said body-bolster and rub-iron being illustrated in central vertical section. Fig. 3 is an elevation of a truck-bolster and a body-bolster, both of usual construction, equipped with side bearings and rub-irons constructed in accordance with and embodying the invention, this figure being presented to illustrate diagrammatically the relation of the side bearings to the truck-bolster, the relation of the rub-irons to the body-bolster, and the relation of the rub-irons and side bearings to one another. Fig. 4 is a top view, partly broken away, of same; and Fig. 5 is a detached top view of one of the rub-irons.

In the drawings, A designates the truck-bolster, and B the body-bolster, these bolsters being of any suitable or usual construction and, as usual, connected by a center pin, which admits of the proper swiveling of the truck. The truck bolster or transom A also has at its center the usual center plate, through which said center pin passes and which receives the weight of the load. My invention is confined to swiveling trucks, but to no special type of swiveling truck.

The side bearings C C are secured centrally upon and adjacent to the end portions of the truck-bolster A, and the rub-irons D are secured to the lower surface and adjacent to the end portions of the body-bolster B, as illustrated in Figs. 3 and 4.

The detailed construction of the side bearings C is illustrated more fully in Figs. 1 and 2, in which it will be seen that the side bearings comprise a base E, a cap or body portion F, and the means for permitting said cap to perform a rotary motion upon a central axis. The base E will be bolted or riveted in rigid position, as indicated in Fig. 4, while the cap F is held in position upon said base E, but is permitted under the influence of the rub-iron to turn or rotate upon a vertical axis.

I have devised several different forms of side bearings in which the cap or body portion is enabled under the influence of the rub-iron to perform a rotary motion upon a vertical axis, and I illustrate in the drawings forming a part of this application the best known construction embodying this principle of operation.

The base E may be pressed up from steel and, as shown, is simply a rectangular plate having its central portion turned upward to form the hub G and provided with the central aperture H to receive the sleeve I, through which the rivet or bolt J passes, and which rivet or bolt keys the cap or body portion F with the sleeve I and retains said cap or body portion in position upon the base E. The cap or body portion F may also be pressed up from a piece of steel and possesses uniform smooth upper surfaces for contact with the rub-irons and the downwardly-extending sides K, which pass downward toward and terminate in near relation to the base E on the line of a circle outwardly removed from but concentric with the outline of the hub G of said base. The body portion F is formed with a central aperture L to receive the rivet or bolt J, and preferably between the head of the bolt J and the upper surface of the cap or body portion F will be supplied a washer M, as illustrated in Fig. 2, to exclude dust and other foreign matter from passing beneath the head of the bolt or rivet J and entering the interior portions of the side bearing. The bolt or rivet J will be passed downward through the aperture L and through the sleeve I and be upset or headed at its lower end, so as to lock the parts of the side bearing together.

The lower edges of the sleeve I are formed with the outwardly-extending annular flange N, and the upper edges of the hub G are formed with the inwardly-extending annular flange O, the latter being directly above the flange N, but separated therefrom a suitable distance to form a chamber to receive and confine the circular row of balls P. The upper surfaces of the flange N and the vertical exterior surfaces of the sleeve I form suitable contacts for the lower and inner sides of the balls P, and likewise the lower surfaces of the flange O and the adjacent substantially vertical surfaces of the hub G furnish contacts for the upper and outer sides of the balls P. It will be seen that the balls P are wholly confined between the hub G and sleeve I and cannot escape therefrom, and it is also to be observed that the outer edges of the annular flange N do not contact with the adjacent surfaces of the hub G, the purpose of this feature of the construction being to prevent friction between said sleeve and hub and to leave a space through which any dust may readily escape from the chamber occupied by the balls P.

Intermediate the sides K of the cap or body portion F and the hub G is formed an annular chamber Q, which receives and confines the row of balls R, the latter being seated between the sides of the cap or body portion F and the hub G and being by preference greater in diameter than the balls P. The balls P reduce the friction between the sleeve I and hub G, and the balls R take the weight of and that thrust upon the cap or body portion F and prevent undue friction during the rotation of said cap or body portion when the latter is being acted upon by the rub-irons. The annular chamber Q has an outlet around the lower edges of the cap or body portion F, and hence any dust coming within the interior portions of the side bearing may find a ready escape.

The central vertical aperture in the sleeve I and the aperture L in the cap or body portion F are angular in cross-section and conform with the shape in cross-section of the bolt or rivet J, and hence during the turning action of the cap or body portion F the motion of the latter will be communicated to said bolt or rivet J and by the latter to the sleeve I, the said sleeve I having a circular perimeter and turning within but free from the walls of the aperture H, formed at the upper end of the hub G. The lower end of the sleeve I is also free from contact with the truck-bolster A, and hence no friction is generated between said sleeve and said bolster.

It will be observed that in the construction presented the balls P and R are intermediate the base E and the movable parts of the said bearing, and hence that the side bearing is an antifriction-bearing.

The rub-irons D correspond with one another, and they are simply hollow casings secured to the lower surface of the bolster B, the lower surfaces of the said rub-irons being segmental or describing the arc of a circle. The rub-irons D are not of special importance as to their details of construction, with the exception that they should be of segmental outline and possess, in order to attain the best results, an inclined lower surface S, as illustrated in Fig. 2, to contact with the upper rounded and downwardly and outwardly inclined surface of the cap or body portion F during the travel of the cars around curves, since with such construction of surfaces for the rub-iron and side bearing a very firm contact of the rub-iron with the side bearing may be secured, and without undue friction or danger of the contacting faces sticking together. It will be observed upon reference to Figs. 2 and 3 that the rub-irons D contact with the side bearings C at one side of the center of the cap or body portion F of the latter, and I prefer to arrange the side bearings and rub-irons in the relation to one another in which they are illustrated in Figs. 3 and 4, in which it will be seen that the rub-irons contact with the side bearings at the inner sides of the latter. It is somewhat a matter of individual judgment, however, whether the rub-irons shall contact with the side bearings at the inner sides of the center of the latter or whether they shall contact with said side bearings at the outer sides of the center of the latter; but I prefer that said rub-irons and side bearings be arranged as illustrated in Fig. 3.

During the travel of the cars around curves the rub-irons and side bearings will contact, and this contact will result in the rub-irons imparting to the caps or body portion F of the side bearings a rotary motion on their vertical axes, the said caps or body portions F being caused to turn axially as they move against said rub-irons, so that under no conditions will the rub-irons and side bearings be able to stick together and cause the wheels, especially on tangent curves, to climb the rails.

In the drawings I illustrate the rub-irons and side bearings as normally separated from one another by a slight space, this being a relation said parts may properly, though of course not necessarily, bear to one another during the travel of the cars on straight tracks.

The axially-rotatable cap or body portion F of the side bearing is circular in outline, so that it may present uniform surfaces at all times to the rub-irons, and the base E is rectangular in outline, so that as the balls at that side of the bearing which more directly receives the weight of the car-body become worn the said base may from time to time, as required, be detached and given a quarter-turn in order to present a fresh set of the balls to take the downward thrust of the rub-iron.

The cap or body portion F and base E are shown as having been formed from steel-plate; but it is obvious that said parts may be formed of cast metal, if preferred, in which event the outlines of the said parts will vary in suitable manner to meet the conditions due to the casting of the parts and the employment of cast metal in lieu of steel-plate.

In the drawings the side bearings are shown secured to the truck-bolster and the rub-irons to the body-bolster; but I do not wish to confine this application to such arrangement of said parts, since if the rub-irons were secured to the truck-bolster and the side bearings to the body-bolster they would coöperate with one another and constitute an improvement over the prior art.

The upper surface of the bolster A may be either horizontal or inclined, as may be preferred, without detriment to the side bearings C; but the latter will have their upper rotatable body portions substantially horizontally disposed, so that they may turn on substantially vertical axes, the latter being central of said body portions and at right angles to the transverse diameter thereof.

Without limiting the invention in every instance to details of form or construction, what I claim as new, and desire to secure by Letters Patent, is—

1. In a swiveling car-truck, the side bearings at the upper surface of said truck at its opposite sides and comprising the body portion and base, the said body portion being adapted to have a rotatory motion on a substantially vertical axis when due to the swiveling action of the truck, said body portion sweeps against the rub-iron; substantially as set forth.

2. In a swiveling car-truck, the side bearings at the upper surface of said truck at its opposite sides and comprising the rotatory body portion adapted to turn on a substantially vertical axis and presenting upper surfaces which extend from a central point outward and downward, combined with a segmental rub-iron on the body-bolster and having inclined lower surfaces to engage said upper surfaces of said body portion at one side of said central point; substantially as set forth.

3. In a swiveling car-truck, the side bearings at the upper surface of said truck at its opposite sides and comprising the rotatory body portion, the rigid base, and the circular row of balls intermediate said base and body portion and taking the weight thrust upon said body portion, the said body portion being adapted to have a rotatory motion on a substantially vertical axis when due to the swiveling action of the truck said body portion at one side of its center sweeps against the rub-iron; substantially as set forth.

4. In a swiveling car-truck, the side bearings comprising the rotatable body portion, the stationary base, the substantially vertical central bolt or rivet connecting said body portion and base and adapted to turn with said body portion, the circular row of small balls P intermediate said bolt or rivet and the surrounding part of said base, and the circular row of larger balls R intermediate the outer portions of said body and said base, combined with the rub-iron for contact with said body portion at one side of the center of the latter; substantially as set forth.

5. The side bearing comprising the upper rotatable body portion, the stationary base having the aperture H and flange O, the central bolt or rivet J engaging said body portion and passing through said aperture, and the sleeve I on said bolt or rivet and having the flange N, combined with the row of balls P held between said flanges N, O, and the row of balls R intermediate said body portion and said base; substantially as set forth.

Signed at New York, in the county of New York and State of New York, this 4th day of May, A. D. 1899.

EDWARD CLIFF.

Witnesses:
 CHAS. C. GILL,
 E. JOS. BELKNAP.